US006728840B1

(12) United States Patent
Shatil et al.

(10) Patent No.: US 6,728,840 B1
(45) Date of Patent: Apr. 27, 2004

(54) METHODS AND APPARATUS FOR PROVIDING HOST CONTROLLED CACHING OF DATA IN A STORAGE SYSTEM

(75) Inventors: Arod Shatil, Chestnut Hill, MA (US);
Edith L. Epstein, Arlington, MA (US);
Stephen A. Ludlum, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 463 days.

(21) Appl. No.: 09/692,974

(22) Filed: Oct. 20, 2000

(51) Int. Cl.[7] ............................................. G06F 13/00
(52) U.S. Cl. ..................... 711/137; 711/113; 711/213; 707/3; 712/207; 712/237; 712/240
(58) Field of Search ................................. 711/137, 113, 711/213; 712/207, 237, 239, 240; 707/3

(56) References Cited

U.S. PATENT DOCUMENTS

| | | | | |
|---|---|---|---|---|
| 5,761,706 A | * | 6/1998 | Kessler et al. | 711/118 |
| 5,887,151 A | * | 3/1999 | Raz et al. | 712/206 |
| 5,890,211 A | * | 3/1999 | Sokolov et al. | 711/113 |
| 6,098,154 A | * | 8/2000 | Lopez-Aguado et al. | 711/137 |
| 6,119,203 A | * | 9/2000 | Snyder et al. | 711/137 |
| 6,175,898 B1 | * | 1/2001 | Ahmed et al. | 711/137 |
| 6,182,133 B1 | * | 1/2001 | Horvitz | 709/223 |
| 6,253,289 B1 | * | 6/2001 | Bates et al. | 711/137 |
| 6,430,653 B1 | * | 8/2002 | Fujikawa | 711/113 |
| 6,442,658 B1 | * | 8/2002 | Hunt et al. | 711/158 |
| 6,460,115 B1 | * | 10/2002 | Kahle et al. | 711/122 |
| 6,473,836 B1 | * | 10/2002 | Ikeda | 711/137 |
| 6,606,617 B1 | * | 8/2003 | Bonner et al. | 707/2 |

* cited by examiner

Primary Examiner—Hong Kim
(74) Attorney, Agent, or Firm—Chapin & Huang, LLC; Barry W. Chapin, Esq.

(57) ABSTRACT

Mechanisms and techniques allow a host computer system to control caching operations within a data storage system. In a typical implementation, the system of the invention operates within a host computer system to intercept requests for access to data stored within a data storage system that originate from applications, programs or other processes that perform (e.g., execute) on the host computer system or another computer system. Once intercepted, the host computer can examine such a request for access to data to determine if the request matches any prefetch criteria defined within a prefetch database provided by the system of the invention. As an example, prefetch criteria defined in a prefetch database can specify various requestors (e.g., applications, programs, processes, users, or the like) that can access data (e.g., specific files, databases, volumes, data types or the like) stored within the data storage system according to various data access techniques (e.g., filesystems command such as open, read, write, seek and so forth). If a request for access to data matches prefetch criteria, the host computer configured with the invention determines prefetch information for related data related to data specified in the request based on the matching prefetch criteria. The prefetch information indicates the manner (e.g., amount, permanence, etc.) in which related data is to be cached in the data storage system. The host computer also obtains storage information for the related data that indicates the location of the related data stored within the data storage system. Using the prefetch information and the storage information, the invention generates one or more prefetch commands which indicate what related data is to be cached within the data storage system and from what storage locations within the data storage system that related data is to be obtained. The prefetch command is then transmitted to the data storage system to cause the data storage system to cache the related data.

22 Claims, 6 Drawing Sheets

GENERATING PREFETCH COMMANDS WITHIN HOST COMPUTER SYSTEM

| ENTRY | REQUESTOR CRITERIA 401 | DATA ACCESS TECHNIQUE CRITERIA 402 | DATA CRITERIA 403 | OTHER PREFETCH CRITERIA 404 | PREFETCH INFORMATION 240 |
|---|---|---|---|---|---|
| 1 | APPLICATION X | OPEN, READ | FILE Y | FILE < 1MB | PREFETCH Y ENTIRELY |
| 2 | APPLICATION Z | OPEN | FILE Q, FILE R, FILE S | 2:00PM - 6:00PM | PREFETCH 2 MB |
| 3 | USER = DBADMIN | ANY ACCESS | DATABASE A | - | PERMACACHE DATABASE A |
| 4 | BACKUP APPLICATION | OPEN OR READ OR SEEK | ANY DATA | USER = BACKUP ADMIN | PREFETCH 1 MB |
| 5 | TIMEFINDER APPLICATION | OPEN OR READ | ANY VOLUME | - | PREFETCH 2MB OF VOLUME |

220
PREFETCH DATABASE CONTAINING PREFETCH CRITERIA AND PREFETCH INFORMATION FOR REQUESTS MATCHING PREFETCH CRITERIA

410
CACHING INSTRUCTIONS INDICATING EITHER DIRECTLY OR INDIRECTLY RELATED DATA TO CACHE, AND OPTIONALLY ANY CACHING PARAMETERS

FIG. 5

METHODS AND APPARATUS FOR PROVIDING HOST CONTROLLED CACHING OF DATA IN A STORAGE SYSTEM

FIELD OF THE INVENTION

The present invention generally relates to systems for managing data storage, and more particularly, to systems and techniques which provide host computer system control over data that is cached within data storage systems.

BACKGROUND OF THE INVENTION

The rapid growth of information service and data processing industries has resulted in a need for data storage systems to efficiently manage and store large amounts of data. Typically, a data storage system that serves this need includes a plurality of high-capacity high-performance disk drives along with some processing circuitry that can store data to and retrieve data from the disk drives. To achieve high-performance when either storing or retrieving data on behalf of computer systems coupled to the data storage system, some data storage systems include an internal cache memory system that serves as an electronic buffer for data being transferred into (i.e. written) or out of (i.e., read from) the disk drives that operate within the data storage system. Since disk drives are highly mechanical in nature, they provide relatively slow access to data as compared to a cache memory system which is fully electronic. As such, a data storage system can use an internal cache memory system as a high-speed storage area for data which host computer systems access.

Certain conventional data storage systems are equipped with logic or processing circuitry which attempts to efficiently utilize an internal cache memory system. Efficient use of a cache memory system is generally preferable because a typical cache memory system is limited in size and is often shared for use by all host computer systems that request access to data within the data storage system. For example, if two host computer systems are coupled to the data storage system and are attempting to concurrently read respective streams of data from the data storage system, the data storage system may use the cache to buffer portions of each stream of data. One conventional attempt to optimally utilize an internal cache memory system in this manner is called "predictive caching."

Predictive caching can detect a sequence of sequential or related access requests to sequentially locate data locations within the data storage system. Upon detecting such a sequence, a predictive caching process in the data storage system can read ahead from a current physical storage location (e.g., from a most recent read operation) and can fill up a portion of the cache memory system with data that the predictive caching process "predicts" will be needed by future read requests. In this manner, predictive caching attempts to use data access pattern recognition techniques such as detecting multiple sequential reads from successively incremental physical disk locations to predict what data will be requested in the future. Based on this prediction, the predictive caching process can then access and cache data before the data storage system actually receives access requests for data.

As a more specific use of predictive caching, consider a scenario in which a host computer system is performing a sequential file access operation, such as might occur during a backup operation of a large file stored within the data storage system onto a tape. The sequential file access operation operates by reading the entire contents of the file byte by byte from physical data storage locations, starting at the beginning of the file and continuing to the end of the file. Without predictive caching, the data storage system handles each read operation within the sequential file access operation as a separate and relatively slow access to data within the disk drives in the data storage system. However, a data storage system that uses predictive caching can detect the sequential pattern of data accesses and can read ahead from the current location in the sequence to place data into the cache memory system. Then, for subsequent read operations that occur during the sequential file access operation, the data storage system can attempt to service those read operations using data from the cache memory system instead of having to service each read operation using disk drive processing circuitry. By detecting access to sequential locations in the disk drives and reading data into the cache memory system before that data is requested, and by servicing future data access requests from the cache using that data, performance of the data storage system using predictive caching is somewhat increased.

Other conventional cache control technologies exist as well. For instance, some data storage systems, such as certain data storage systems of the Symmetrix line manufactured by EMC corporation of Hopkinton, Mass., include a cache control software interface which allows an application on a host computer system to externally control caching of data within the internal cache of the data storage system. For example, an application that routinely uses a specific file can include embedded calls to functions within the cache control software interface which can instruct the data storage system to permanently cache the file within its internal cache memory system. As the application executes on the host computer system and requests access to the file from the data storage system, the data storage system can provide such access from its internal cache memory system instead of having to service such access requests via access to the disk drives in the data storage system.

SUMMARY OF THE INVENTION

There are a variety of shortcomings related to the aforementioned conventional techniques of caching data within a data storage system. For example, conventional predictive caching techniques rely on the ability to detect a pattern or sequence of sequential physical access requests to data storage locations within disk drives in the data storage system. It is not until a predictive caching process detects such a pattern or sequence that caching of data can occur. This results in the data storage system having to process a number of data access requests without caching prior to the predictive caching process detecting the sequence of sequential access request. In other words, predictive caching cannot begin to operate until the predictive caching process in the data storage system recognizes a data access pattern. Accordingly, predictive caching does not achieve a performance gain for data access requests which occur during the period of detection of a data access patterns.

Predictive caching also suffers in part from a problem related to caching unnecessary data. Once a predictive caching process within the data storage system detects a sequential access pattern to data, the predictive caching process caches a certain amount of data in the internal cache memory system within the data storage system. However, since the predictive caching process is unaware of precisely how much data is required to be cached, the predictive caching process may unknowingly cache more data than is actually required. This results in an inefficient use of the cache memory system which is an expensive resource within the data storage system.

Predictive caching may cache unnecessary data in a variety of circumstances. By way of example, consider a scenario in which a sequential file access operation is nearing completion of access to the file. During the sequential access operation, a conventional predictive caching process periodically caches large blocks of data into the internal cache memory system in the data storage system in an attempt to anticipate future read requests for such data. However, when the sequential access operation has completed reading the last portion of data for the file being accessed, the sequential access operation will no longer issue read requests for further data in the cache. However, since the predictive caching algorithm is unaware of the precise use of the data which is cached, the predictive caching algorithm, during its most recent predictive caching operation, may have cached significantly more data from physical disk locations that extend well beyond the physical disk locations corresponding to the end of the file being accessed. Accordingly, any data from physical disk locations after the end of the file that the predictive caching algorithm places in the cache will go unused. Such unnecessary cached data occupies cache resources that could be used for other caching operations.

Another problem with conventional data storage system caching techniques arises due to file and disk fragmentation issues. In computer systems that use open systems operating systems such as Unix, a single file created by the operating system may be physically stored in fragments which may be located across many non-sequential areas of one or more disk drives within a data storage system. In other words, certain operating systems allow a single file to be broken up into smaller fragments which may be respectively stored in any unused areas within a data storage system which are large enough to accommodate the respective individual fragments. By fragmenting a file in this manner, physical disk space within a data storage system is put to optimal use. From the perspective of a software application on a host computer system however, file system processing within the operating system on the host computer system manages and tracks the diverse locations of the fragments of a file as a set of disk extents maintained by the file system. This allows the operating system to present the file logically to software applications as a single cohesive or continuous portion of data.

While fragmentation of files or other data may provide for optimal use of disk space, fragmentation poses problems to conventional data storage system caching operations. For example, returning to the aforementioned example of backing up a file, suppose the file is fragmented across a number of different physical locations within the disk drives of a data storage system. When the conventional predictive caching process in the data storage system detects the initial pattern of sequential read requests for data from the first fragment of the file, the predictive caching process attempts to read ahead from the most recent physical access location in the disk drive in order to cache data to service future read requests. However, as the backup process issues further read requests to backup data from locations of the file which span two non-sequentially located fragments of file data stored in the disk drives within the data storage system, the first read request for the first portion of data from a different fragment of the file will request data from the data storage system that is most likely not in the cache. This will result in a "cache miss" which decreases data storage system performance.

The cache miss also causes the data storage system to retrieve the data from the disk drives at the location of the next fragment of the file, as specified in the most recent read request, instead of using cached data.

Moreover, fragmentation also causes the problem of caching unnecessary data because the most recent predictive caching operation most likely will have cached data that extends beyond the end of the file fragment. This data is not relevant to the stream of read requests from the backup process to obtain data from the file (e.g., in this example, predictive caching caches data which is not part of the file being backed up).

Further still, fragmentation causes a break in the predictive caching pattern of sequential read requests and thus the predictive caching process will not reinstate predictive caching again until the process can detect a sufficient number of read requests from another fragment of the file that establish a sequential access pattern. Such problems will be repeated over and over for each fragment as the physical locations of data being read from the file within the data storage system are sequentially broken from each fragment to the next.

Generally speaking, conventional predictive caching techniques, also sometimes referred to as data "prefetching" techniques, are most beneficial for only truly sequentially arranged data such as that stored by mainframes. Such conventional techniques can suffer to various degrees from the aforementioned problems when used for caching data which is arranged non-sequentially within a data storage system.

Turning attention now to the conventional techniques of using a cache control software interface from within an application performing on a host computer system to control caching in a data storage system, such techniques also suffer from a number of deficiencies. An application that uses the conventional cache control software interface must be modified to take advantage of such an interface. Typically, this requires knowledge of the existence of the cache control software interface during the software development process for that application. The software developer must have specialized knowledge about how to incorporate function calls which properly manipulate the cache control software interface to cause the data storage system to cache the appropriate data on behalf of the application incorporating such function calls. For pre-existing or legacy applications, the source code for such applications is rarely available to allow the incorporation of such custom function calls, and if it were available, significant amounts of evaluation, development, debugging and testing time must be spent in order to modify an existing application to take advantage of a cache control software interface.

In contrast to the aforementioned conventional caching techniques, the present invention provides systems, methods and techniques which optimize the use of cache memory systems within data storage systems. In general, the system of the invention allows a host computer system to more precisely control cache operations within a data storage system in a variety of circumstances and does not require specific modification to applications within the host computer system. Instead, the system of the invention provides a generic host-based cache controller which can intercept requests for access to data (e.g., file system or other requests to read, write, open, seek, etc.) which occur within a host computer system. The invention compares such requests to a variety of different prefetch criteria. Based on such comparisons, the system of the invention determines prefetch information. Prefetch information indicates how data that is related to the data for which access is requested, hereinafter referred to as "related data," is to be cached within the cache memory system of the data storage system which stores such related data.

Related data may include the actual data specified in the request to access data, or related data may be any other data that is somehow associated or related to the data specified in the request to access data. For example, if the request to access data requests "read" access to a portion of a file, the related data might be the remaining portions of the file for which access has not yet been requested. Thus, in this example, prefetch information may indicate that the entire remaining portions of the file are to be placed into the cache in a data storage system coupled to the host computer system.

If the system of the invention determines that such related data should be prefetched (i.e., obtained from disk and cached) in whole or in part (i.e., as indicated by the prefetch information), the system of the invention can proceed to obtain storage information for the related data. The storage information can precisely define the storage locations of the related data within the data storage system. For example, the storage information may indicate the precise locations (e.g., disk extents) of data stored in multiple fragments across different disk drives within the data storage system for the file to which access is initially requested.

Using the storage information along with prefetch information determined based on the prefetch criteria matching the request for access to data, the system of the invention can formulate prefetch commands which are then transmitted to the data storage system and which cause the data storage system to cache data identified in the prefetch commands. In other words, the prefetch commands can specify how the data storage system is to cache the related data. Since the system of the invention operates on the host computer system and has access to precise locations (e.g., disk extents) of data to which host applications request access, the prefetch commands generated by the invention can precisely instruct a data storage system to cache only data that is relevant to the application requesting access. In this manner, the aforementioned problems of conventional caching techniques such as caching unnecessary data or having to wait to cache data until sequential access patterns are detected are significantly avoided. Moreover, since the system of the invention is general in nature and can serve requests for many applications, no modification to existing applications is required, as is the case with the use of conventional cache control software interfaces.

In certain embodiments, the invention does not remove or disable the operation of predictive caching techniques within a data storage system. Such embodiments allow the prefetch commands generated by the invention to override predictive caching operations for data specified in the prefetch commands. In other words, predictive caching can be used in situations where the invention does not provide prefetch commands to a data storage system.

More specifically, the present invention provides mechanisms and techniques that operate in a host computer system to cause a storage system coupled to the host computer system to cache data.

According to one embodiment of the invention, such a method comprises the steps of receiving a request to access data, generating a prefetch command for related data based on a comparison of the request against prefetch criteria, and transmitting the prefetch command to the storage system to cause the storage system to cache at least a portion of the related data. The request to access data may be, for example, a filesystem request from an application executing on the host computer system or on another computer system coupled to the host. In the later case, the request to access data might be sent to the host computer system over a network, using a protocol such as the Network File System (NFS) protocol.

The step of receiving traps, intercepts or otherwise obtains the request to access data (e.g., a file system request) and generates the prefetch command for related data specified or otherwise associated with the data specified in the request by comparing information in or associated with the request against prefetch criteria defined in a prefetch database. If an entry in the prefetch database matches such a comparison, the entry further defines prefetch information which indicates how the related data should be cached. The operation of generating the prefetch command also can obtain storage information for the related data, for example, from a file system or other processing technique in the host computer system. The storage information indicates storage locations which convey the precise layout of the related data within the data storage system.

The step of generating the prefetch command can then use the prefetch information along with the storage information to generate the required prefetch command which is then transmitted to the storage system to cause the storage system to prefetch the related data associated with the request to access data in a cache memory system (a cache) within the storage system. In this manner, the system of the invention alleviates the need to rely on predictive caching within the data storage system. Instead, by intercepting request(s) to access data within the host computer system and determining caching instructions and storage information for the related data within the data storage system, the invention can formulate prefetch commands within the host computer system which more precisely define how to cache the related data and which also indicate exactly where to obtain that data within the data storage system. This substantially overcomes the problems associated with conventional predictive caching techniques.

According to another embodiment of the invention, the request to access data specifies a requester requesting access to the data and specifies a data access technique for accessing the data and specifies data to which access is requested. A data type may also be specified in the request or may be determined based on the request. For instance, the requestor may be an application, a process, a user or another entity (e.g., remote computer system) identifiable within the host computer system that requests access to some data via a filename specification. The filename in the request may imply a specific type of data, such as by a file extension (e.g., filename.jpg for JPEG image data). Alternatively, the data to which access is requested may have special data (i.e., a magic number at the beginning of a file) that indicates the type of data to which access is requested. The data access technique may be a file system command such as a read, write, seek, open, close or other data access or input-output command or operation and the data may be a file, database, volume, or other portion of data stored within the data storage system.

As noted above, the related data for which the invention generates a prefetch command may be inclusive of the data specified in the request, or the related data may be other data not specifically identified in the request but that is in some manner (to be explained) associated with or related to the data specified in the request to access data. Such related data may be, for example, any remaining data of a file for which the request to access data is attempting access, or may be a portion of, or an entire remainder of a database. In this invention, related data may also include other files or portions of other files that are in some manner related to or associated with the data to which access is requested as specified in the request to access data. The relationship between the data specified in the request and the related data may be determined, for example, by an administrator configuring the prefetch information, as will be explained in more detail, or may be determined automatically such as, for example, in a case where the related data is the entire remainder of a file to which access is requested.

In this embodiment, the step of generating a prefetch command includes the steps of querying a prefetch database containing the prefetch criteria to obtain prefetch information based on the request using a prefetch query containing at least one of a) a characteristic of the data and b) a characteristic of the request to access data. Characteristics of the request to access data may include, for example, the requestor requesting access to the data and/or the data access technique for accessing the data. Characteristics of the data may include the identity of the data to which access is requested or the type of data to which access is requested. The method then formulates the prefetch command based on the prefetch information. The prefetch information includes caching instructions and may include the storage information, or, the storage information may be obtained separately. The invention may use the storage information in conjunction with the prefetch information to generate or formulate one or more prefetch commands which specify, for example, caching instruction(s) for the related data.

In yet another embodiment, the prefetch information includes caching instructions for the related data and the step of formulating the prefetch command includes the steps of obtaining storage information for the related data stored in the storage system and applying the prefetch information including the caching instructions to the storage information for the related data to generate at least one prefetch command that specifies a portion of the related data to cache in the storage system from a location in the storage system specified by the storage information. The steps operate in a host computer system such that when the prefetch command is transmitted to the storage system via the step of transmitting, the prefetch command advises the storage system to i) obtain the portion of the related data from the location, and ii) cache the portion of related data. By advises, what is meant is that the prefetch command provides instructions for the data storage system to follow. However, in certain instances such as unavailability of cache space, the data storage system might not carry out the prefetch commands. Generally however, in most circumstances, the prefetch commands will cause the data storage system to cache the related data as instructed.

In another embodiment, the caching instructions may specify that the related data is to placed into a permanent cache within the storage system such that the storage system will not remove the related data from the permanent cache until instructed to do so.

In a further embodiment, the request to access data specifies a requestor requesting access to the data and specifies a data access technique for accessing the data and specifies data to which access is requested. Also, the prefetch criteria is maintained as entries in a prefetch database, and each entry includes at least one of: i) requestor criteria indicating an identity of a requester who may request access to the data, ii) data access technique criteria indicating a type of access to the data to be made by a requestor matching the requester criteria, iii) data criteria indicating data to which access is requested according to the data access technique by a requester matching the requestor criteria. Also in this embodiment, each entry includes corresponding prefetch information that includes caching instructions that apply to the related data that is associated with or related to the data specified in a request that matches the prefetch criteria of that entry.

In still another embodiment, the request is a file system command to access data. Also, the step of receiving a request to access data includes the steps of intercepting the file system command from an application performing on the host computer system that attempts to access the data by sending the file system command to a file system in the host computer system and forwarding the file system command to a prefetch lookup process in the host computer system and forwarding the file system command to the file system in the host computer system so that the file system can perform the file system command. In this manner, the invention does not disturb conventional application operation of a host computer system by allowing requests to access data to proceed, for example, to the file system for conventional processing. In other words, the invention can trap a request access data and forward the request to both the file system and also to a prefetch lookup process which performs according to the invention. The file system command will allow the host computer system to access the data specified in the file system command, while the invention can proceed to generate prefetch command(s) for related data which might, for example, specify that any remaining un-accessed portions of the file are to be cached in the data storage system. In this example then, the related data may be the entire file (in which case the related data is inclusive of the data specified in the request to access data), or alternatively, the related data may be only the remaining un-accessed portions of the file (in which case the related data does not include the data specified in the request to access data).

In another embodiment, the request to access data is a file system request received from an application and the data is a file stored within the storage system. In this embodiment, the step of generating includes the steps of obtaining prefetch information indicating how related data from the file is to be cached in the storage system. The prefetch information is obtained based on the comparison of the request against prefetch criteria contained in a prefetch database in the host computer system. The method further obtains storage information including disk extent information indicating storage locations (e.g., physical disk extents) where the file (e.g., the related data) is stored within the storage system and generates the prefetch command based on the prefetch information and the storage information.

There are known techniques that exist within a host computer system that can obtain storage information such as disk extent information for a given portion of data, such as a file, database, volume, and the like. Such known techniques may include the use of the file system, certain operating system functions, or other mechanisms that operate within the host computer system to provide an indication of the physical locations of the data (related data in this case) stored on disks or other media within a data storage system.

The prefetch command contains instructions that instruct the storage system to obtain and cache portions of data from the file (i.e., as related data) from the storage locations within the storage system indicated by the disk extent information. Since the system of the invention operates within a host computer system, and the host computer system includes mechanisms such as an operating system and/or a file system which contain mappings of the precise physical and logical locations of data associated with files, databases or other sources, prefetch commands generated by the system of the invention can contain caching information that precisely defines what data is to be cached from which storage locations within the data storage system and thus substantially eliminates caching of unnecessary data. In other words, the prefetch commands generated in this invention are based on prefetch information that indicates what related data is to be cached and storage information that indicates exactly where that data is located within the data storage system such that the data storage system can receive such prefetch commands and can access the related data at the specified locations and can cache the related data.

In another embodiment, the prefetch command transmitted to the storage system indicates to the storage system to cache portions of the file located at the storage locations indicated by the disk extent information.

In another embodiment, the disk extent information indicates storage locations of the file that are fragmented across different storage locations within the storage system and wherein the prefetch command transmitted to the storage system indicates to the storage system to cache portions of the file located at the storage locations of the file that are fragmented across different storage locations within the storage system. This embodiment thus substantially eliminates problems associated with conventional caching systems do to file fragmentation issues.

In another embodiment, the host computer system includes a prefetch optimizer process which is integrated and inter-operates with a host prefetcher process. The prefetch optimizer can periodically optimize the prefetch criteria based on cache feedback from the storage system such that subsequent prefetch commands generated based on the prefetch criteria increase cache performance in the storage system.

Another method embodiment of the invention operates in a host computer system and is directed to a method for controlling data cached in a cache in a storage system such as a disk-based data storage system. This method embodiment comprises the steps of receiving a request to access data from an application performing on the host computer system and producing prefetch information containing caching instructions for related data that is related to the data specified in the request to access data by comparing the request to access data against prefetch criteria defined within a prefetch database in the host computer system. The method further obtains storage information for the related data. The storage information indicates a layout of storage locations within the storage system that store the related data. The method generates at least one prefetch command that instructs the storage system to cache the related data from storage locations indicated in the storage information and according to the caching instructions contained in the prefetch information. Finally, the method transmits the prefetch command to the storage system to cause the storage system to cache at least a portion of the related data.

Other embodiments of the invention relate to computer systems configured in various manners, and in particular, to host computer systems which are configured to perform all of the methods and techniques disclosed herein as the invention.

One such embodiment is a computer system comprising a processor, an interface coupled to a storage system, a memory system encoded with a host prefetcher process and prefetch criteria, and an interconnection mechanism coupling the processor, the interface and the memory system. In this embodiment, when the processor performs the host prefetcher process, the processor causes the host computer system to cache data in the storage system. This is done by performing the steps of receiving a request to access data in the storage system and generating a prefetch command for related data based on a comparison of the request against the prefetch criteria encoded in the memory system and transmitting the prefetch command from the host computer system to the storage system via the interface to cause the storage system to cache at least a portion of the related data.

Other such embodiments of a computer system configured in this manner include logic instructions encoded in the memory system to perform all of the methods disclosed herein as the invention. Such embodiments include a host computer system configured to control caching within a data storage system by performing any or all of the aforementioned methods via software control, or via hardware and/or software configured to perform those methods and the techniques disclosed herein as the invention. While preferred embodiments of the invention are implemented as one or more software processes, programs, routines, libraries or other entities that perform (e.g., are executed, interpreted or otherwise operated) within the host computer system, the invention should not be construed as being limited to software and may be performed by circuitry or specialized processors within a host computer system.

Other embodiments of the invention that are disclosed herein include software programs to perform the method operations summarized above and disclosed in detail below. In particular, such embodiments include a computer program product having a computer-readable medium including computer program logic encoded thereon that when performed on a host computer system, causes the host computer system to control caching of data with a storage system. In such embodiments, when the computer program logic is performed on a processor in the host computer system, the computer program logic causes the processor to perform any or all of the method operations disclosed herein as the invention. These embodiments of the invention are typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a host computer system to cause the host computer system to perform the techniques explained herein as the invention.

It is to be understood that the system of the invention can be embodied strictly as a software program, as software and hardware, or as hardware alone. Is also to be understood that the cache control processes of this invention typically performs (e.g., executes, runs, or is otherwise operated) on a host computer system coupled to a data storage system. The data storage system may be a simple single disk system or may be a highly complex large-scale file server, RAID array or other type of data storage system. An example of such a data storage system is the Symmetrix line of data storage systems manufactured by EMC Corporation of Hopkinton, Mass. The invention may also be embodied in software applications also manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 5 illustrates an example of the prefetch database containing prefetch criteria and corresponding prefetch information for entries that contain prefetch criteria that matches a request for access to data according to an example embodiment of the invention.

DETAILED DESCRIPTION OF PREFERRED EMBODIMENTS

Figure 1:
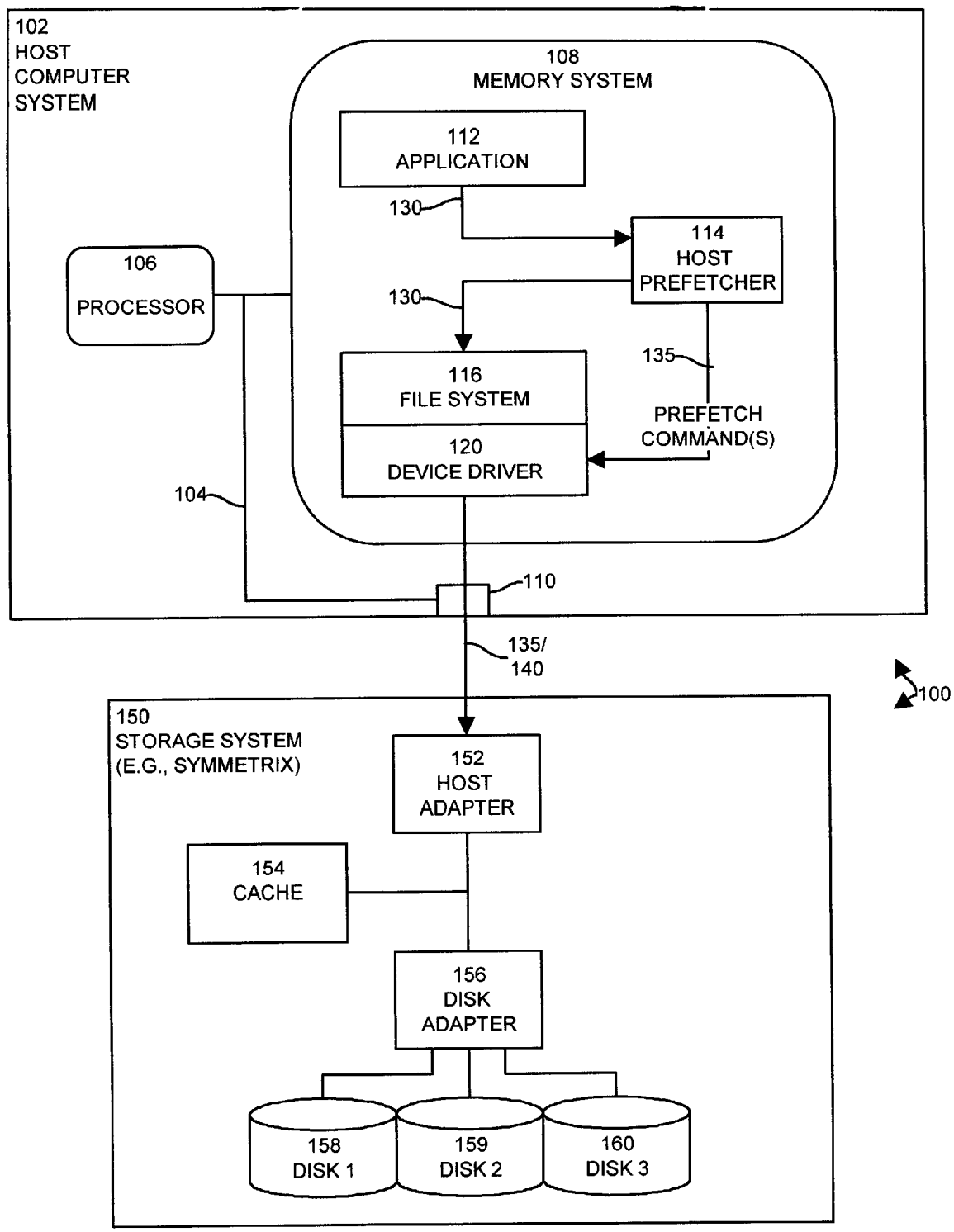
FIG. 1 illustrates a computing system environment including a data storage system coupled to a host computer system configured according to one embodiment of the invention.

The present invention provides techniques and mechanisms that allow a host computer system to control caching operations within a data storage system. In a typical implementation, the system of the invention operates within a host computer system to intercept requests for access to data stored within a data storage system. Such requests may originate from applications, programs or other processes that perform (e.g., execute) on a host computer system or another computer system coupled to the host (e.g., via a network). Once intercepted, the host computer equipped with the invention can examine such requests for access to data to determine if a request matches any prefetch criteria defined (as will be explained) within the system of the invention. As an example, prefetch criteria defined in a prefetch database can specify various requesters (e.g., applications, programs, processes, users, remote computers, or the like) that can access data (e.g., specific files, databases, records, volumes, or the like) stored within the data storage system according to various data access techniques (e.g., open, read, write, seek, close and so forth). If a request for access to data matches prefetch criteria, the computer using the invention determines prefetch information for related data that is associated with or otherwise related to the data specified in the request, based on the matching prefetch criteria entry in the prefetch database.

Generally, the prefetch information indicates how any related data associated with a request for access to data (e.g., a file to be accessed by the request) is to be cached within the data storage system. That is, the related data indicates which additional data the data storage system is to cache, in addition to (or inclusive of) the data specified in the request to access data. As an example, prefetch information may define related data that specifies how many bytes of a file to cache (e.g., 1 MB) at one time, and/or, may define whether portions of the related data are to be permanently cached or temporarily cached. Once the host computer using the invention matches a request for access to data against the prefetch criteria to determine the prefetch information for the related data, the host computer system then obtains storage information for the related data to determine where the related data is specifically (e.g., physically) located within the data storage system. Using the prefetch information and the storage information, the host computer system equipped with the system of the invention then formulates one or more prefetch commands which are transmitted to the data storage system to cause the data storage system to cache the related data as defined by the prefetch information.

Using these techniques, the invention provides a cache controller for a data storage system which resides and operates within a host computer system to control caching operations within the data storage system on behalf of different applications that require access to data. As will be further explained, the system of the invention may be easily administered such that a systems manager/administrator of host computer system equipped with the invention can, for example, create rule-like prefetch criteria entries to which the system can compare requests for access to data to govern caching operations for one or more applications or programs that perform within the host computer system. By obtaining the combination of prefetch information that indicates how related data is to be cached and storage information that indicates where that related data is located, the invention is able to precisely define relevant related data to be cached within a data storage system. This substantially eliminates conventional cache management problems such as caching delay, caching unnecessary data and problems do to file fragmentation, and, further substantially eliminates the need to modify individual applications to use custom cache management software interfaces. The overall effect is to significantly increase the optimal use of cache memory systems within data storage systems which thereby increases overall data storage system performance.

FIG. 1 illustrates a computing system environment 100 which is suitable for use in explaining the general operation of example embodiments of the invention. The example computing system environment 100 comprises a host computer system 102 which includes an interconnection mechanism 104 that couples a processor 106, a memory system 108 and an interface 110 which couples the host computer system 102 to a data storage system 150. The memory system 108 is encoded with software processes which include an application 112, a host prefetcher process 114 configured in accordance with the invention, a file system 116 and a device driver 120. The data storage system 150 includes a host adapter 152, a cache memory system 154 and a disk adapter 156 which collectively manage data storage within a plurality of disk drives 158 through 160 (DISK1, DISK2, DISK3).

According to the general operation of the illustrated example embodiment of the invention, as the application 112 performs (e.g., via execution by the processor 106) within the host computer system 102, the application issues requests for access to data 130. Such requests 130 may include, for example, file system calls such as "open" to open a file, "read" to read from a file, "write" to write to file, "seek" to advance to a position in a file or other such operations. The host prefetcher process 114 receives the requests to access data 130 by trapping or otherwise intercepting such requests 130. Once the host prefetcher process 114 receives a request 130, the host prefetcher process 114 processes the request as explained herein to generate one or more prefetch commands 135 which can remotely control caching of data called "related data" that is associated or otherwise related to data specified in the request 130, based on a comparison of the request 130 against prefetch criteria (to be explained, not specifically shown in this figure).

Generation of prefetch commands 135 according to embodiments of the invention involves comparing the request to access data 130 against prefetch criteria to determine prefetch information that is relevant to the related data that is related to the data for which access is requested by the request to access data 130. Prefetch information may include caching instructions or other information indicating how the related data is to be cached within the data storage system 150. The host prefetcher process 114 also obtains storage information for the related data which indicates locations of the related data within disk drives 158 through 160 within the data storage system 150. Using a combination of the prefetch information and storage information, the host prefetcher process 114 can formulate one or more prefetch commands 135 which precisely define how the related data is to be cached.

Once the prefetch commands 135 are generated in this manner, the host prefetcher process 114 transmits the prefetch commands 135 to the data storage system 150 to cause the data storage system 150 to cache, within the cache 154, at least a portion of the related data that is associated with the data to which access is requested within the request 130.

It is to be understood that in this embodiment, the host prefetcher process 114 also allows the request to access data 130 to be forwarded unchanged to the file system 116 for processing according to conventional file system processing techniques. In this manner, the request to access data 130 passes through the file system 116 and the device driver 120 and passes from the host computer system 102 via interface 110 as a data access command 140 to the data storage system 150. The data access command 140 thus causes the data storage system to access data specified in the request to access data 130, while the prefetch command(s) 135 cause the data storage system to cache the related data specified in the prefetch command(s) 135. The related data may be data in addition to data specified in the request to access data 130 such that the data storage system will pre-cache such related data in anticipation of future access requests 130 that request access to the related data.

Figure 2:
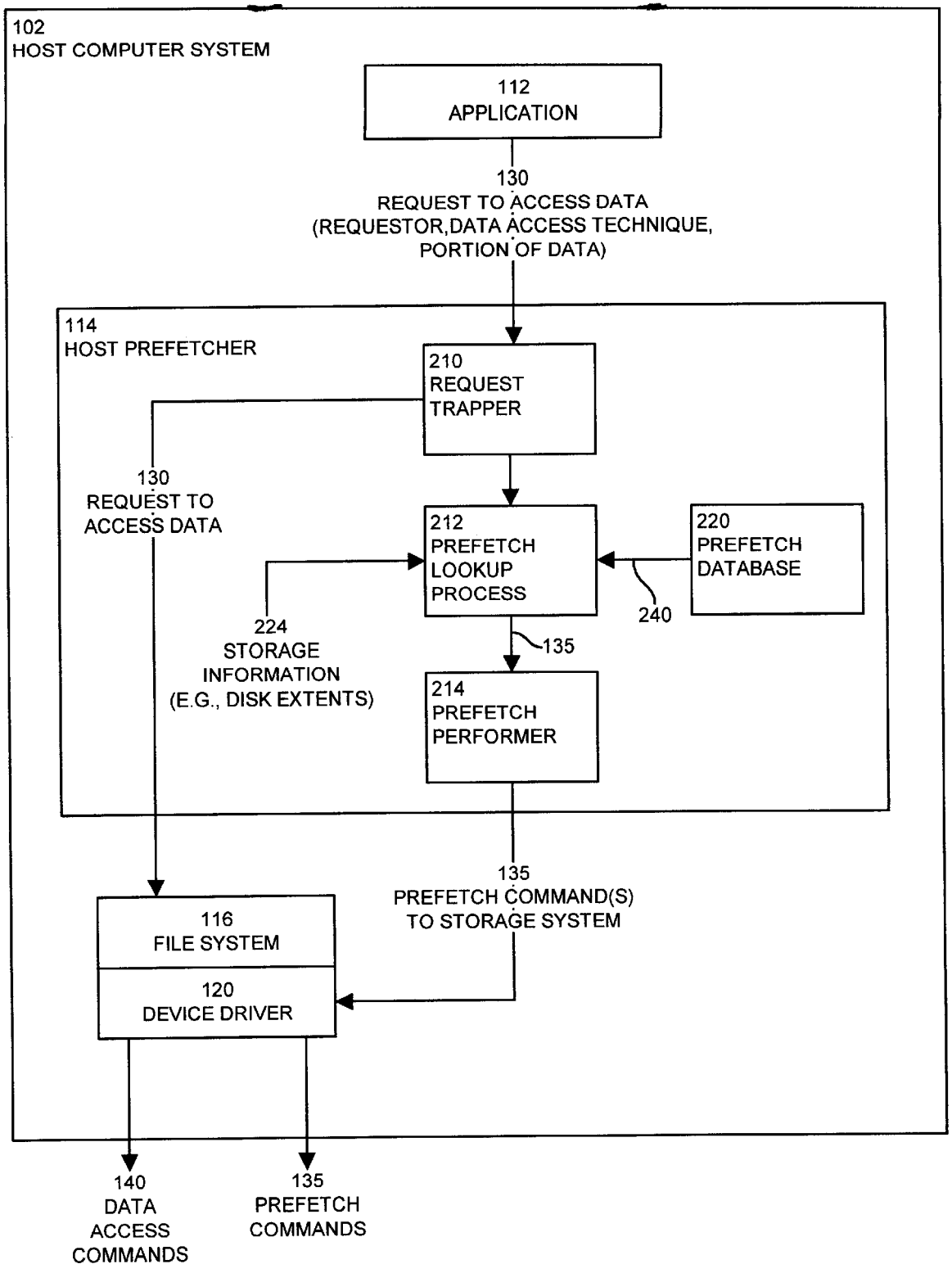
FIG. 2 illustrates an example architecture of one embodiment of the invention implemented within a host computer system.

FIG. 2 illustrates a more detailed architecture of a host computer system 110 configured with a host prefetcher process 114 configured according to one embodiment of the invention. The host prefetcher process 114 includes a request trapper 210, a prefetch lookup process 212, a prefetch performer 214 and a prefetch database 220. Generally, the request trapper 210, prefetch lookup process 212 and prefetch performer 214 are software processes, functions, routines or other modules within the host prefetcher process 114 which the processor 106 can execute, interpret, run or otherwise perform within the host computer system 102. To this end, the host prefetcher process 114 is preferably implemented as software logic instructions encoded within the memory system 108 which are performed by the processor 106 to carry out the operation of the method embodiments of the invention.

Figure 3:
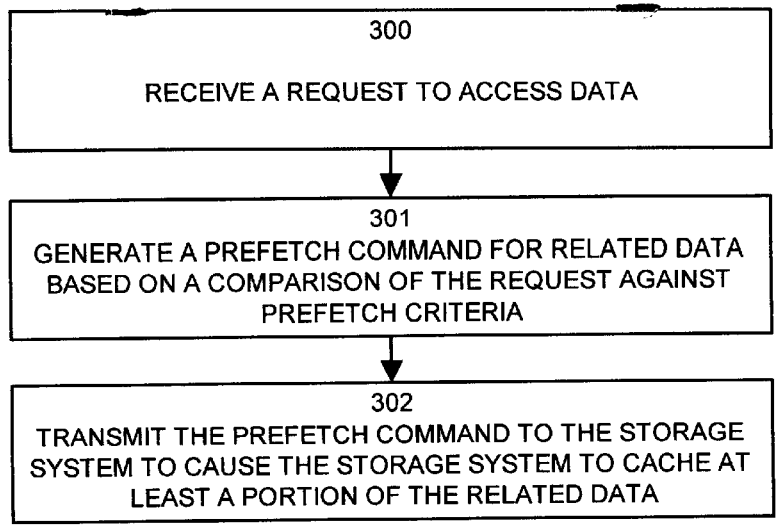
FIG. 3 illustrates a flow chart of processing steps that show the general operation of one embodiment of the invention.

FIG. 3 provides a flow chart of the general processing steps performed by the host prefetcher process 114 illustrated in FIG. 2.

In step 300, the request trapper 210 receives a request to access data 130. As illustrated in FIG. 2, a typical request to access data 130 includes or specifies an identification of a requestor, a data access technique, and a portion of data to be accessed on behalf of the requester according to the data access technique. In other words, the request to access data 130 indicates "who" is asking for access to "what" data and "how". Examples of a requestor include the software application 212 which may be any software program, procedure, process or other entity which the processor 106 (or another remote processor) performs to cause a request to access data 130 to be generated. Examples of data access techniques specified within the request to access data 130 include reading data, writing data, seeking to a specific location of data, opening a file, closing a file, getting a web page, and so forth. Examples of a portion of data to be accessed are a file name or specification, a record in a database, a web page, or any other type of data or location of data that may be stored or exist within the data storage system 150.

In the example embodiment in FIG. 2, the request trapper 210 operates as an interface or wrapper between the application 212 (one or more) and a file system 116 so as to trap or otherwise intercept any file system calls 130 for access to data within the data storage system 150. Also in this example, the request trapper 210 allows the request to access data 130 to proceed to be passed unmodified to the file system 116. That is, the request trapper 210 maintains a copy of the request to access data 130 for processing according to the invention, and also allows the request to access data 130 to be processed by the file system 116 according to conventional file system processing techniques. Once the request trapper 210 obtains the request to access data 130, the request trapper 210 forwards the request to access data 130 to the prefetch lookup process 212 which performs step 301 in FIG. 3.

In step 301, the prefetch lookup process 212 generates a prefetch command 135 for data (related data) related to the portion of data specified in the request to access data 130 based upon a comparison (e.g., a query) of information (e.g., requester, data access technique, specific portion of data to which access is requested or other information such as a type of data requested) within the request 130 against prefetch criteria defined within the prefetch database 220. An example of prefetch criteria within a sample prefetch database 220 is illustrated in FIG. 5, which will be explained shortly.

In step 301, if the request to access data 130 matches any prefetch criteria defined within the prefetch database 220, the prefetch database 220 returns prefetch information 240 to the prefetch lookup process 212. The prefetch information 240 is used in the process of generating the prefetch commands 135 to identify the related data and to indicate how the related data is to be cached, as will be explained in more detail with respect to the flow chart of processing steps shown in FIG. 4.

Also as will be explained shortly, during generation of a prefetch command 135 in step 301, the prefetch lookup process 212 uses storage information 224, which indicates locations of the related data (within disks in the data storage system 150) to be cached (in cache 154) for use in generating the prefetch command 135. To this end, the prefetch lookup process 212 generates the prefetch command 135 to indicate to the data storage system 150 how the related data (or portion thereof) associated with the portion of data specified in the request 130 is to be cached (based on prefetch information 240) within the data storage system 150 and where that related data is located (based on storage information 224) within the disks 158 through 160.

In step 302, the prefetch lookup process 212 passes the prefetch command 135 to the prefetch performer 214 which transmits the prefetch command 135 to the data storage system 150 to cause the data storage system 150 to cache at least a portion of the related data.

Figure 4:
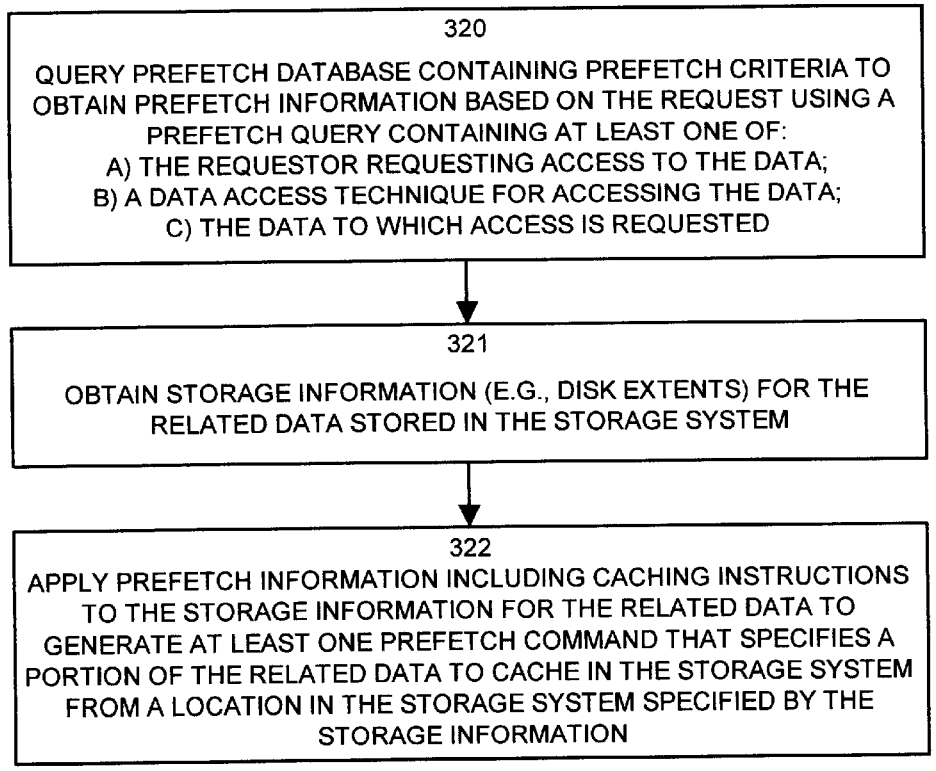
FIG. 4 is a flow chart of processing steps that shows details of the operation of the process of generating prefetch commands within a host computer system according to one embodiment of the invention.

FIG. 4 illustrates a flow chart of processing steps that the prefetch lookup process 212 performs to generate prefetch commands 135 within the host computer system 102. That is, FIG. 4 illustrates the details of step 301 from FIG. 3 according to one example embodiment of the invention.

In step 320, the prefetch lookup process 212 queries the prefetch database 220 containing prefetch criteria to obtain prefetch information 240 based on the request to access data 130. Specifically, to obtain the prefetch information 240, the prefetch lookup process 212 queries the prefetch database 220 to obtain prefetch information 240 based on the request 130 by specifying one or more of a characteristic of the request to access data and/or a characteristic of the data itself. While not intended to be limiting, characteristics of the request to access data may include i) the requestor requesting access to the data as specified in the request 130, ii) the data access technique for accessing the data as specified in the request 130, or iii) other information contained in the request 130. Characteristics of the data itself may include i) the identity or specification of the data to which access is requested as specified by the portion of data within the request 130 and/or ii) a data type indicating what type of data is being requested. The prefetch lookup process 212 may query other prefetch criteria as well (e.g., a current time, a data structure containing a specific value, etc.) in trying to determine prefetch information 240. In response to such a prefetch query, the prefetch database 220 returns the prefetch information 240.

The prefetch information 240 preferably includes caching instructions which indicate an identity of the related data (precisely or indirectly) as well as how related data that is associated with the portion of data specified in the request to access data 130 is to be cached within the cache memory system 154 of the data storage system 150. For example, the prefetch information 240 can indicate that the entire portion of data associated with or related to the data specified in the request 130 is to be cached, in which case the related data is the entire file, database, or other entity associated with the portion of data for which access is requested in the request 130. This is an explicit or precise identity of the related data. Alternatively, the prefetch information 240 can indicate a predetermined amount of related data (e.g., 1 MB, 2 MB, or another amount) that is to be cached, which is an indirect identity of the related data (since it may vary from request to request depending upon a current access location of the data in the request 130). In yet another configuration, the prefetch information 240 can indicate that the related data is to be permanently cached such that the data storage system 150 will not discard the data within the cache 154 until instructed to do so. In this manner, the prefetch information 240 can specify cache control information including (but not limited to) sizes, data longevity or other information relating to how the related data is to be cached within the data storage system 150, in addition to specifying the related data.

The prefetch information 240 may indicate precisely what the related data is (e.g., one or more filenames including directory path, etc.) or may indirectly specify the related data, for example, by indicating that the related data is a certain amount of (or the entire portion of) a file containing the specific data to which access is requested in the request 130. Generally, related data as specified in the prefetch information is greater in size than the specific data for which access is requested in request 130, and may be inclusive of the specific data or exclusive of the specific data specified in the request 130.

Next, in step 321, the prefetch lookup process 212 obtains storage information 224 for the related data stored in the data storage system 150. In this example embodiment, the prefetch lookup process 212 obtains the storage information 224 using known techniques for accessing disk extent information (i.e., the physical layout or locations of the related data on the disks within the data storage system) within a host computer system such as host 102. Such techniques may include the use of the file system 116, an operating system and/or software interfaces that can provide physical disk extent information to a requesting process (in this case, the prefetch lookup process 212). An example of a software interface that can assist in providing physical disk extent information (i.e., storage information) for a given portion of related data is the Symmetrix Application Programming Interface (SYMAPI) software manufactured by EMC Corporation. The storage information 224 indicates how the related data associated with the portion of data specified in the request to access data 130 is physically laid out or located within the disks 158 through 160 (FIG. 1) of the data storage system 150. In one embodiment, the storage information 224 indicates disk extent information for a file of data so as to convey the physical layout of the file including any fragmentation within the data storage system 150.

Next, in step 322, the prefetch lookup process 212 applies the prefetch information 240 including caching instructions to the storage information 224 for the related data to generate at least one prefetch command 135 that specifies a portion of the related data to be cached in the data storage system 150 from a location in the data storage system 150 as specified by the storage information 224. In other words, the prefetch lookup process 212 uses the storage information 224, in conjunction with caching instructions in the prefetch information 240 obtained by matching prefetch criteria in the prefetch database 220 to the request to access data 130, to define precisely which related data locations within the disks 158 through 160 of the data storage system 150 are to be cached in the cache 154 within the data storage system 150. When a prefetch command 135 is generated in this manner and is transmitted (via step 302 in FIG. 3) to the data storage system 150, the data storage system 150 performs the prefetch command to cache the related data as instructed in the prefetch command 135.

FIG. 5 illustrates an example of the prefetch database 220 containing prefetch criteria fields 401 through 404 and corresponding prefetch information 240. It is to be understood that the example prefetch database 220 illustrated in FIG. 5 is somewhat simplified for ease in understanding example embodiments of the invention. While illustrated in this example as the table, the prefetch database 220 may be any type of data structure or data storage mechanism that can store and retrieve data.

The example prefetch database 220 includes columns of prefetch criteria including "requester criteria" 401, "data access technique criteria" 402, "data criteria" 403 and optionally, one or more columns of "other prefetch criteria" 404. Each row in the prefetch database 220 corresponds to one prefetch criteria entry.

The column of requester criteria 401 lists the various entities such as software applications, programs, computer systems or users that can supply requests to access data 130. The column of data access technique criteria 402 lists the various types of access or actions that requesters from the requestor criteria 401 can specify within a request to access data 130. The column of data criteria 403 lists portions of data to which requesters (401) request access to by the requests to access data 130. The other prefetch criteria 404 lists any other optional prefetch criteria that must be met by the requests to access data 130 in order to obtain prefetch information 240 during the generation of prefetch commands 135.

The prefetch database 220 also includes a column of "PREFETCH INFORMATION" 240. The prefetch information 240 generally specifies caching instructions 410 that specify, for example, how a portion of data related to the data for which access is requested in a request to access data 130 that matches an entry (i.e., prefetch criteria in columns 401 through 404) in the prefetch database 220 is to be cached within the data storage system 150. Prefetch information 240 may indicate, for example, the related data that is to be cached, and optionally, any caching parameters such as an amount of related data to cache, whether to permanently or temporarily cache the related data, a specific cache location (e.g., address range in cache 154) to cache the related data, and so forth.

As explained above, during the processing of FIGS. 3 and 4, the system of the invention compares requests to access data 130 against entries (rows) in the prefetch database 220 in order to find a matching entry that specifies prefetch information 240 that indicates the manner in which related data associated with the request 130 is to be cached within data storage system 150.

By way of example, entry number one (Row 1) in the prefetch database 220 indicates that if "APPLICATION X" (i.e., a requesting application 112) attempts to perform an OPEN or READ data access technique (for any amount of data) on a file named "FILE Y" and the file is less than 1 megabyte (MB) in size (as defined in the other prefetch criteria column 404), then the invention is to generate a prefetch command 135 that instructs the data storage system 150 to prefetch and cache "FILE Y" (the related data) in its entirety. Accordingly, when the prefetch lookup process 212 receives a request to access data 130 (step 300 in FIG. 3), the prefetch lookup process 212 can query (step 320 in FIG. 4) the prefetch database 220 using information from the request 130. Assuming the request 130 matches entry number one, the prefetch lookup process 212 obtains the prefetch information 240 from the prefetch database 220 that specifies that the data storage system 150 is to "PREFETCH Y ENTIRELY." That is, in this example, if APPLICATION X supplies an OPEN or READ access request 130 for FILE Y, the system of the invention will create a prefetch command 135 that contains instruction for the data storage system 150 to cache the contents of FILE Y, which is the related data to the data for which access is requested in request 130, in its entirety.

Continuing this example to its completion, the prefetch lookup process 212 obtains (step 321 in FIG. 4) the storage information 224 that indicates the storage locations of "FILE Y" within the disks 158 through 160 within the data storage system 150 (i.e., obtains the disk extent information for "FILE Y"). Using the storage information 224 and the prefetch information 240, the prefetch lookup process 212 can generate (step 301 and 322 in FIGS. 3 and 4) a prefetch command 135 to instruct the data storage system 150 to cache an entire copy of "FILE Y" in the cache 154.

Since a prefetch command 135 generated in this manner indicates the precise storage locations of FILE Y, the invention greatly optimizes use of the cache. The system of the invention avoids caching unnecessary data and further avoids the need to detect multiple attempts to access data prior to instructing the data storage system 150 to cache the contents of FILE Y as related data. In other words, the advantages of caching can be achieved upon the first access request 130, instead of having to detect an access pattern as in conventional cache management techniques. Further still, since this example embodiment of the invention resides as a software layer which operates transparently to the application 112 (APPLICATION X in this example), no modification of APPLICATION X is required for the invention to operate. This allows legacy applications to take advantage of the optimal use of the cache as provided by the invention.

It is worth mentioning here that the example prefetch database 220 in FIG. 5 illustrates other aspects of the system of the invention. For example, the other prefetch criteria column 404 can specify alternative prefetch criteria that must be met in order to generate prefetch command(s) 135 based on a request to access data 130.

Consider entry number two of the prefetch database 220 in which the OTHER PREFETCH CRITERIA column 404 specifies the time period 2 PM–6 PM which must be satisfied in order for the host prefetcher process 114 to generate a prefetch command 135 for related data associated with a request to access data 130. In other words, if a request 130 to OPEN any one of the data files "FILE Q", "FILE R" or "FILE S" arrives at the host prefetcher process 114 from the application "APPLICATION Z," the prefetch lookup process 212 will generate a prefetch command 135 that will instruct the data storage system 150 to prefetch 2 MB of the requested file (i.e., 2 MB of the file from the current access position), as related data, into the cache 154, but only if the current time is between 2 PM and 6 PM in the afternoon. This example illustrates the flexibility of the system of the invention to allow a systems administrator of the host computer system 102 to define prefetch criteria that can precisely manage caching operations within the data storage system 150. Perhaps, in this example, if the application "APPLICATION Z" requires access to the files "FILE Q", "FILE R" or "FILE S" during a period of time between 2 PM and 6 PM in the afternoon, the data storage system 150 must provide such access using the highest possible performance available.

As another example, entry number four of the prefetch database 220 specifies prefetch information 240 that indicates that if a backup application intends to OPEN, READ or SEEK any data from the data storage system 150 and is operating under control of a user on the host computer system 102 who is a backup administrator, then the host computer system 102 generates a prefetch construction 135 that instructs the data storage system 150 to prefetch 1 MB (i.e., the next 1 MB) of the data specified in a request for access to data 130, as related data. In this manner, this example entry imposes a security mechanism upon the cache which requires that if a backup is being performed and the data storage system 150 is to use the cache 154, a backup administrator must be operating the backup application.

Another aspect of the flexibility of the system of the invention is illustrated by the prefetch information 240 associated with entry number three in the prefetch database 220. Prefetch information 240 in entry number three instructs the data storage system 150 to "PERMACACHE DATABASE A" as related data if a DBADMIN user attempts any access to data within DATABASE A. "Permacache" is a mechanism to cause the data storage system 150 to permanently store data within the cache memory system 154 until instructed otherwise to remove the data.

Typically, the data storage system 150 caches data within the cache memory system 154 using a least recently used (LRU) cache algorithm that displaces data that is the oldest or least recently accessed. In other words, when new data must replace other data within the cache 154 due to cache space or size limitations, the data storage system 150 displaces the oldest cached data first. However, the permacache command illustrated in the prefetch information 240 in entry number three of the prefetch database 220 causes the system of the invention to generate a prefetch command 135 that instructs the data storage system 150 to place related data in the cache 154 (in this example, the entire contents of DATABASE A) in a more permanent manner, such that the related data will not be replaced until the data storage system 150 is told to release the related data entered into the cache 154 using the permacache command.

Finally, with respect to FIG. 5, it is to be understood that the system of the invention may, for example, allow a systems administrator of the host computer system 102 to modify any information within the prefetch database 220, for example, using conventional database modification techniques. The ease by which the systems administrator can change prefetch criteria (columns 401 through 404) and/or storage information 240 within the prefetch database 220 provides flexibility in the way the host computer system 102 can control data stored within the cache 154. Conventional host-based cache management techniques prior to this invention required, for example, modification of the source code of an application numeral 112 and further required recompilation and re-execution of the application 112 in order to change the way in which an application 112 managed data within the cache 154 of the data storage system 150. Conversely, the prefetch database 220 of this invention can modified with ease by a systems administrator with the effect of changing cache usage without requiring program or application modification.

Figure 6:
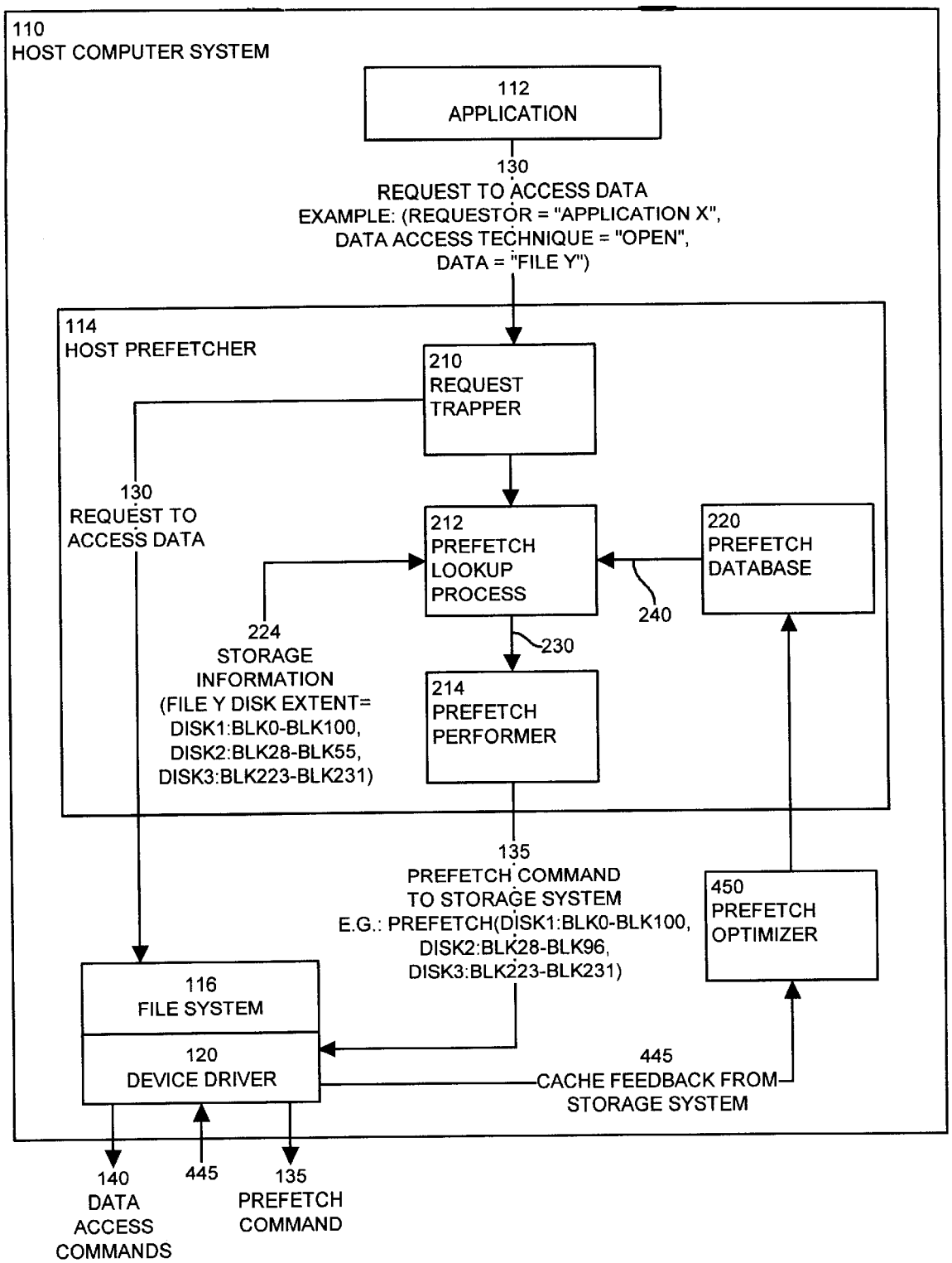
FIG. 6 illustrates a host computer system operating according to a more specific example use of the invention and includes a prefetch optimizer configured according to one embodiment of the invention.

FIG. 6 illustrates an example use of the system of the invention in processing a sample request to access data 130 and further illustrates an alternative embodiment of the invention.

This embodiment includes a prefetch optimizer 450 that operates (e.g., executes) as a software process within the host computer system 110 to dynamically and/or automatically modify the contents of the prefetch database 220 in response to analysis of cache feedback information 445 from the data storage system 150. As explained above, the system of the invention supports the ability for a systems administrator of the host computer system 102 to manually alter or modify the contents of the prefetch database 220 to change the manner in which the data storage system 150 caches data within the cache 154. This embodiment, however, can automatically and dynamically make such modifications without intervention by a systems administrator. Generally, to do so, the prefetch optimizer 450 can obtain cache feedback information 445 from the data storage system 150 (via a query or another technique) and, based on the cache feedback information 445, can alter or "tweak" prefetch information 240 or prefetch criteria entries (values within columns 401 through 404 in FIG. 5) within the prefetch database 220.

During operation of a typical data storage system 150, the data storage system 150 maintains statistical information about the use of the cache 154. For example, the data storage system 150 may record the number of cache hits or cache misses during a particular period of time and/or for a particular portion of data (e.g., during access to a certain disk). The prefetch optimizer 450 can query the data storage system 150 to obtain this information as cache feedback information 445. Based on the cache feedback information 445, the prefetch optimizer 450 may determine, for example, that cache miss rates for a particular portion of data are high, low or normal. When such a determination is made that cache hit or miss rates are inadequate, the prefetch optimizer 450 may modify prefetch information 240 within entries of the prefetch database 220 to increase or decrease the use of the cache 154 within the data storage system 150 for a particular portion of related data for which the cache miss rate is high or low.

By way of example, referring again to FIG. 5 and specifically to entry number two, suppose that cache feedback information 445 indicates that from 2 PM to 6 PM, the cache miss rates for FILES Q, R and S are fifty percent. This indicates that fifty percent of the time the cache 154 contains data that is sought by requests to access data 130 and the other fifty percent of the time the data storage system 150 must obtain requested data from a disk. If the prefetch optimizer 450 is programmed or otherwise configured to maintain the cache miss rate for these files at a rate lower than 30 percent, the prefetch optimizer 450, upon determining the fifty percent cache miss rate from the cache feedback information 445, may increase the use of the cache for FILES Q R and S between 2 PM 6 PM. To do so, the prefetch optimizer 450 can modify the prefetch information 240 for entry number two to increase the prefetch data, for example, from 2 MB to 4 MB of related data. Thereafter, after another period of data processing occurs in the host computer system 102 between 2 PM and 6 PM using the modified entry number two that prefetches 4 MB of related data for FILES Q R and S (instead of the former 2 MB of related data), the prefetch optimizer 450 may determine that the cache miss rate drops to twenty-five percent, which is within acceptable limits.

It is to be understood that alternatives to this embodiment are possible as well. For example, the host computer system 102 may maintain the cache feedback information 445 directly within the prefetch database 220 as part of the other prefetch criteria 404, such that an entry (i.e., a row) in the prefetch database 220 might include a cache-hit or miss rate for a particular portion of data for use in deciding if a request to access data 130 matches that entry. Other possibilities include testing a cache utilization rate. By way of example only, the other prefetch criteria 404 might trigger a matching entry by containing a test of the current cache utilization rate as obtained from the cache feedback information 445. If the cache utilization rate were below, say, ninety percent, then that entry might match a request 130 to allow a certain amount of related data to be cached for a file being accessed by the request 130. However, if the cache utilization rate were above ninety percent, the entry would not match and thus no related data would be cached in the event of the request 130. In this manner, the prefetch database 220 can be dynamically adjusted in real-time to conditions within the data storage system.

Also illustrated in FIG. 6 is a sample request to access data 130. Specifically, this example request to access data 130 is a file system command that specifies that "APPLICATION X" (the requestor) is requesting to "OPEN" (the data access technique) the file "FILE Y" (the portion of data). The processing performed by the invention on the example request 130 to cause the data storage system 150 to cache data for FILE Y is shown by the processing steps 500 through 505 in a flow chart in FIG. 7.

Figure 7:
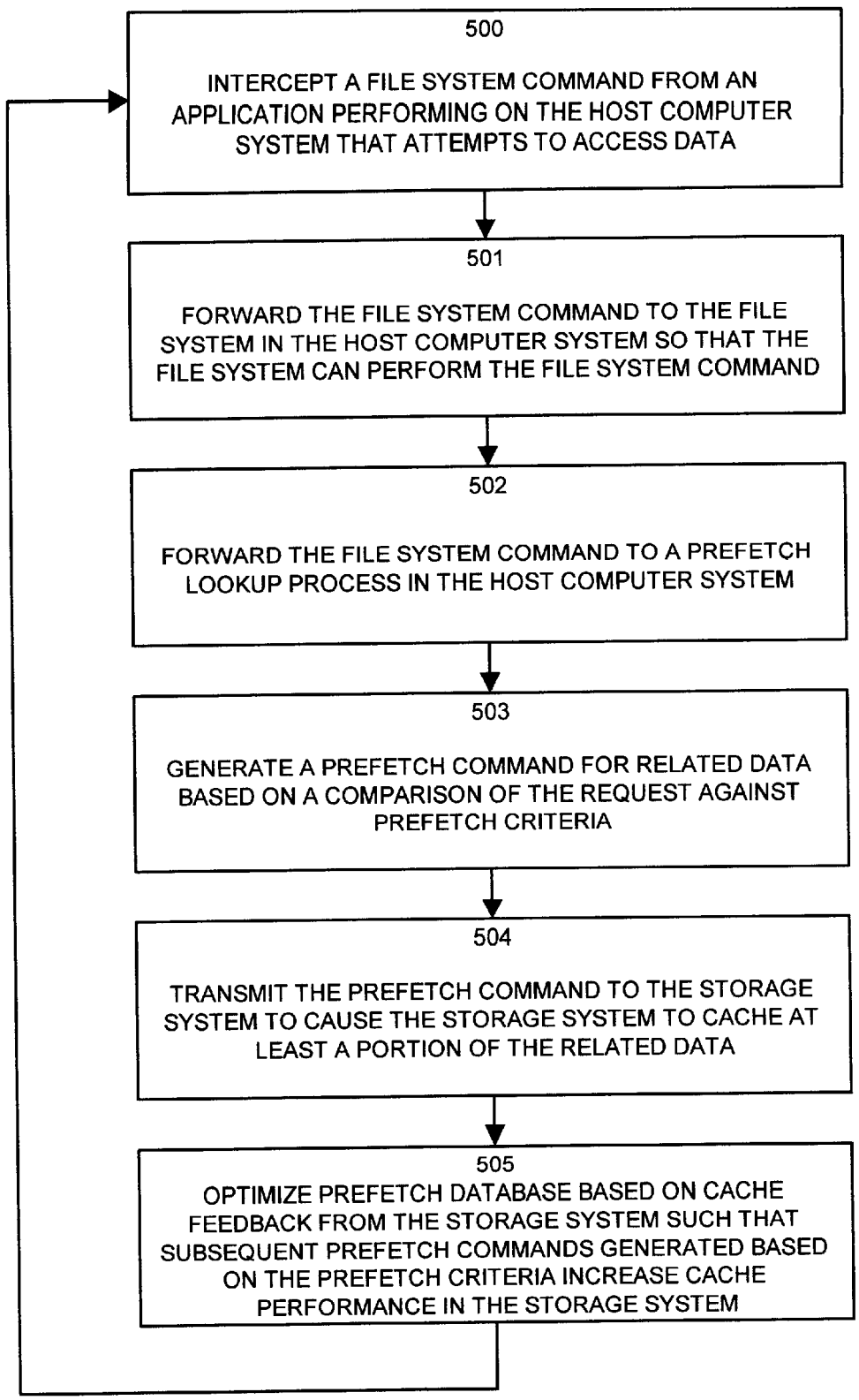
FIG. 7 is a flow chart of processing steps showing a more detailed operation of an embodiment of the invention including the use of the prefetch optimizer shown in FIG. 6.

In FIG. 7, in step 500, the request trapper 210 intercepts the OPEN file system command (i.e., the request to access data 130) from the APPLICATION X that performs on the host computer system 110.

In step 501, the request trapper 210 forwards the file system command (the OPEN request 130) to the file system 116 within the host computer system 110 such that the file system 116 can perform the file system command in a conventional manner.

In step 502, the request trapper 210 also forwards the OPEN file system command request 130 to the prefetch lookup process 212 which, in step 503, generates a prefetch command 135 for related data based on a comparison of the file system command (request to access data 130) against prefetch criteria in the prefetch database 220. Generally, step 503 includes the processing of the steps 320 through 322 in FIG. 4, as previously explained.

More specifically, as shown in the example prefetch database 220 in FIG. 5, the sample OPEN request 130 shown in FIG. 6 matches the prefetch criteria (columns 401 through 404) for prefetch database 220 entry number one. As such, entry number one specifies that the entire contents of FILE Y is to be treated as data related to (i.e., relate data) the request 130.

In this example, since the "other prefetch criteria" 404 for entry number one specifies that the size on the file FILE Y must be less than 1 MB, this example embodiment obtains the storage information 224 for FILE Y via processing step 321 (FIG. 4) prior to the full completion of step 320. That is, in this embodiment, the host prefetcher process 114 processed the steps 320 and 321 in FIG. 4 concurrently, since it is the case here that the size of FILE Y is needed to determine if the request to access FILE Y (the OPEN request 130 in FIG. 6) matches the other prefetch criteria 404 for entry number one in the example prefetch database 220 in FIG. 5.

Returning attention now to FIG. 6, note that the example storage information 224 for FILE Y is a set of file extent information that conveys that FILE Y is stored on DISK 1 (158 in FIG. 1) from disk blocks BLK0 through BLK100, and on DISK 2 (159 in FIG. 1) from disk blocks BLK28 through BLK55, and on DISK 3 (160 in FIG. 1) from disk blocks BLK223 through BLK231. In other words, FILE Y is fragmented within the data storage system 150. It should be understood that these are example disk extents and that actual disk extents conveying file or other data (e.g., database) storage locations can differ from these examples. For example, disk extent information (storage information 224) may be conveyed in bytes, blocks, tracks, cylinders, sectors, volumes, or other measurements and/or location or size indicators, depending upon, for example, how the file system 116 maps data between physical and logical file and/or data locations and sizes within a data storage system 150.

To this end, in step 503 in FIG. 7, the prefetch lookup process 212 obtains the storage information 224 for the FILE Y data stored in the storage system 150 and then applies the prefetch information 240 (from the prefetch database 220) including the caching instructions 410 (FIG. 5) to the storage information 224 for the FILE Y data to generate at least one prefetch command 135 that specifies the related data (the entire FILE Y in this example, as specified by the prefetch information 240 for entry number one in the sample prefetch database 220 in FIG. 5) to cache in the cache 154 in the data storage system 150 from a location in the data storage system 150 specified by the storage information 224 (the disk extent information). In other words, step 503 in FIG. 7 generates a prefetch command 135 that instructs the data storage system 150 to obtain and cache at least a portion of (in this case, the entire contents of) the file FILE Y as related data from disk storage locations within the data storage system 150 indicated by the disk extent information.

In step 504, the host prefetcher process 114 (via the prefetch performer 214) transmits the prefetch command 135 to the data storage system 150 to cause the storage system 150 to cache the related data associated (via the above processing) with the request 130. In this specific example, since the file FILE Y is less than one MB in size, the prefetch command 135 in FIG. 6 instructs the data storage system 150 to cache that the entire set of blocks for FILE Y (the entire file extent) in the cache 154 as related data.

Next in step 505, the prefetch optimizer 450 optimizes the prefetch database based on cache feedback information 445 from the data storage system 150 such that subsequent prefetch commands 135 generated based on the prefetch criteria increase cache performance in the data storage system 150. As explained above, this allows even further optimization of cache usage in the data storage system 150.

Using the techniques explained herein, the system of the invention is able to, for each request to access data 130, determine if related data associated with the request 130 is to be cached, and if so, to determine exactly where to obtain the related data and how to the cache that related data (e.g., how much and in what manner) within the data storage system 150. Since the system of the invention operates on a host computer system 102, the precise locations of data stored on behalf of the host 102 are available for use by the host prefetcher process 114 using techniques noted above. This allows the host prefetcher process 114 to have up-front knowledge about where related data to be cached is physically stored within the data storage system 150. Conventional cache management techniques that operate within the data storage system 150 do not have this information available and are thus unable to precisely determine, for example, if a file or other portion of data is distributed or fragmented across different portions of data storage within the data storage system 150. However, since the invention is based in part on the observation that a host computer system 102 is able to obtain this storage information, the system can generate highly accurate prefetch commands 135 which precisely indicate which disk storage locations within the data storage system 150 are to be cached as related data and in what manner they are to be cached.

Those skilled in the art will understand that there can be many variations made to the operations and mechanisms explained herein while still achieving the same objectives of the invention.

By way of example, the prefetch information 240 may indicate more than one portion of related data that is to be cached in response to receiving a request 130. For instance, multiple filenames may be specified as prefetch information for one entry in the prefetch database 220. In such a case, if the request 130 matches the entry, then the invention creates prefetch commands 135 to have a plurality of portions of related data (multiple files, in this example) cached in the data storage system 150.

As another example, in another alternative configuration, the prefetch lookup process 212 does not have to obtain the storage information 224 from an external source during generation of the prefetch command 135. Instead, the prefetch database 220 may include the storage information 224. Such an embodiment may be useful, for example, in situations where the location and/or size of data does not change within the data storage system 150. In such cases, the prefetch information 240 may include not only the caching instructions 410 (FIG. 5), but can also include storage information 224 such as disk extent information that conveys the exact physical locations of the related data to be cached within the data storage system 150.

In yet another variation on the invention, the host prefetcher process 114 may be located in different software components within a host computer system 110. For example, the host prefetcher process 114 may be embedded (in whole or in part) as part of a kernel of an operating system. In such an implementation, the host prefetcher process 114 may operate as a filter within the operating system kernel to detect requests 130 to access files or other data. Since an operating system may have access to disk extent and mapping information for files or other data within the data storage system 150 via the aforementioned means, the system of the invention as explained above can use this information to determine the precise locations of files and/or data within the data storage system 150. Accordingly, an operating system equipped with the host prefetcher functionality of this invention can trap requests to access data 130 within the operating system and can formulate prefetch commands 135 according to the general techniques outlined above.

According to another variation of the aforementioned embodiments, the host prefetcher process 114, whether implemented above the file system 118 or within a kernel of an operating system, can be configured to detect sequential accesses to data within the data storage system 150. In this embodiment then, the host prefetcher process 114 is more strictly focused on caching data which is determined to require sequential accesses by a process (e.g., a backup application 112) within the host computer system 110. That is, in a similar manner to the way in which conventional predictive caching algorithms operate within a data storage system 150 to detect sequential access patterns to data, an embodiment of the invention can use such sequential access detection techniques (e.g., pattern recognition) to trigger operation of the invention, except that such sequential access patterns are detected by the request trapper 210 within the host prefetcher process 114 of the invention. In this manner, this alternative embodiment of the invention operates during sequential data accesses, rather than for any request to access data. In contrast to the aforementioned embodiments which are applicable at any time for any requests 130, the invention can be limited to use in sequential data access scenarios such as may occur in backup applications where look-ahead caching is often beneficial.

It is also to be understood that while the aforementioned example embodiments illustrate the system of the invention as receiving requests for access to data 130 from applications which perform (e.g., execute) locally within a host computer system 102 that provides the invention, the invention is not limited as such. In particular, an application 112 may perform on a remote computer system and provide the request(s) to access data remotely, for example, by a network connection (not specifically shown) between the computer system performing an application requesting the data and the host computer system which implements the system of the invention. That is, the invention is not limited to environments in which a request for access to data originates locally on the same host computer system that operates the invention.

As a specific example, technologies such as the Network File System (NFS) protocol allow a computer system to export filesystems for access by other computer systems over a network. In such cases, the system of the invention can be implemented within or in conjunction with an NFS server process within the host computer system that exports a filesystem, or, alternatively, can be implemented within an NFS client before sending the request to the NFS server. In either case, the invention may operate irrespective of where the request for access to data originates. If embodied in an NFS client, the invention may require the ability to query the NFS server or other processes for disk extent information for the related data related to the requested data.

Those skilled in the art will appreciate that other variations are also possible. For example, the flow charts of processing steps as explained above described processing events in certain sequences. It is to be understood that modifications to the order of these processing steps is possible while still achieving the objectives of the system of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In a host computer system, a method for causing a storage system coupled to the host computer system to cache data, the method comprising the steps of:

receiving a request to access data, the request to access data specifying at least one of a requestor requesting access to the data and a data access technique for accessing the data and data to which access is requested;

generating a prefetch command for related data based on a comparison of the request against prefetch criteria, generating a prefetch command further including the steps of:

querying a prefetch database containing the prefetch criteria to obtain prefetch information based on the request using a prefetch query containing at least one of:

a) a characteristic of the data;

b) a characteristic of the request to access data; and formulating the prefetch command based on the prefetch information; and transmitting the prefetch command to the storage system to cause the storage system to cache at least a portion of the related data, wherein:

the prefetch information includes caching instructions for the related data; and wherein the step of formulating the prefetch command includes the steps of:

obtaining storage information for the related data stored in the storage system; and applying the prefetch information including the caching instructions to the storage information for the related data to generate at least one prefetch command that specifies a portion of the related data to cache in the storage system from a location in the storage system specified by the storage information, such that when the prefetch command is transmitted to the storage system via the step of transmitting, the prefetch command advises the storage system to:

i) obtain the portion of the related data from the location; and ii) cache the portion of related data.

2. The method of claim 1 wherein the caching instructions specify that the related data is to be placed into a permanent cache within the storage system such that the storage system will not remove the related data from the permanent cache until instructed to do so.

3. The method of claim 1 wherein the request is a file system command to access data and wherein the step of receiving a request to access data includes the steps of:
   intercepting the file system command from an application performing on the host computer system that attempts to access the data by sending the file system command to a file system in the host computer system;
   forwarding the file system command to a prefetch lookup process in the host computer system; and
   forwarding the file system command to the file system in the host computer system so that the file system can perform the file system command.

4. The method of claim 1 further including the step of:
   periodically optimizing the prefetch criteria based on cache feedback from the storage system such that subsequent prefetch commands generated based on the prefetch criteria increase cache performance in the storage system.

5. The computer system of claim 11 wherein the prefetch criteria is further indicative of a qualitative, location independent data content specific selection.

6. In a host computer system, a method for causing a storage system coupled to the host computer system to cache data, the method comprising the steps of:
   receiving a request to access data;
   generating a prefetch command for related data based on a comparison of the request against prefetch criteria; and
   transmitting the prefetch command to the storage system to cause the storage system to cache at least a portion of the related data, wherein:
      the request to access data specifies a requester requesting access to the data and specifies a data access technique for accessing the data and specifies data to which access is requested; and
      the prefetch criteria is maintained as entries in a prefetch database, each entry including at least one of:
         i) requestor criteria indicating an identity of a requester who may request access to the data;
         ii) data access technique criteria indicating a type of access to the data to be made by a requestor matching the requester criteria;
         iii) data criteria indicating data to which access is requested according to the data access technique by a requester matching the requestor criteria; and
      wherein each entry includes corresponding prefetch information that includes caching instructions that apply to the related data that is related to the data specified in a request that matches the prefetch criteria of that entry.

7. In a host computer system, a method for causing a storage system coupled to the host computer system to cache data, the method comprising the steps of:
   receiving a request to access data;
   generating a prefetch command for related data based on a comparison of the request against prefetch criteria; and
   transmitting the prefetch command to the storage system to cause the storage system to cache at least a portion of the related data,
   wherein the request to access data is a file system request received from an application and wherein the related data is a file stored within the storage system and wherein the step of generating includes the steps of:
      obtaining prefetch information indicating how related data from the file is to be cached in the storage system, the prefetch information obtained based on the comparison of the request against prefetch criteria contained in a prefetch database in the host computer system;
      obtaining storage information including disk extent information indicating storage locations where the file is stored within the storage system; and
      generating the prefetch command based on the prefetch information and the storage information, the prefetch command containing instructions that instruct the storage system to obtain and cache portions of related data from the file from the storage locations within the storage system indicated by the disk extent information.

8. The method of claim 7 wherein the prefetch command transmitted to the storage system indicates to the storage system to cache portions of the file located at the storage locations indicated by the disk extent information.

9. The method of claim 7 wherein the disk extent information indicates storage locations of the file that are fragmented across different storage locations within the storage system and wherein the prefetch command transmitted to the storage system indicates to the storage system to cache portions of the file located at the storage locations of the file that are fragmented across different storage locations within the storage system.

10. A computer system comprising:
   a processor;
   an interface coupled to a storage system;
   a memory system encoded with a host prefetcher process and prefetch criteria;
   an interconnection mechanism coupling the processor, the interface and the memory system;
   wherein, when the processor performs the host prefetcher process, the processor causes the host computer system to cache data in the storage system by performing the steps of:
      receiving a request to access data in the storage system, the request to access data specifying at least one of a requester requesting access to the data, and a data access technique for accessing the data, and data within the storage system to which access is requested;
      generating a prefetch command for related data based on a comparison of the request against the prefetch criteria encoded in the memory system, the processor further performing the steps of:
         querying, via a prefetch query based on the request to access data, a prefetch database encoded in the memory system that contains the prefetch criteria to obtain prefetch information encoded within the prefetch database in the memory system, the prefetch query containing at least one of:
            a) a characteristic of the data;
            b) a characteristic of the request to access data; and
         formulating the prefetch command based on the prefetch information; and
      transmitting the prefetch command from the host computer system to the storage system via the interface to cause the storage system to cache at least a portion of the related data wherein:

the prefetch information includes caching instructions for the related data; and wherein when the processor performs the step of formulating the prefetch command, the processor further performs the steps of:

obtaining storage information for the related data stored in the storage system, the storage information indicating storage locations of the related data within the storage system; and applying the prefetch information including the caching instructions to the storage information for the related data to generate at least one prefetch command in the memory system that specifies a portion of the related data to cache in the storage system from a location in the storage system specified by the storage information, such that when the prefetch command is transmitted to the storage system via the step of transmitting, the prefetch command advises the storage system to:

i) obtain the portion of the related data from the location; and ii) cache the portion of related data.

11. The computer system of claim 10 wherein the caching instructions specify that the related data is to placed into a permanent cache within the storage system such that the storage system will not remove the related data from the permanent cache until instructed to do so.

12. The computer system of claim 10 wherein:

the request to access data is a file system command to access data; and wherein when the processor performs the step of receiving a request to access data, the processor further performs the steps of:

intercepting the file system command from an application encoded within the memory system and performing on the host computer system that attempts to access the data by sending the file system command to a file system encoded within the memory system;

forwarding the file system command to a prefetch lookup process in the host computer system; and forwarding the file system command to the file system in the host computer system so that the file system can perform the file system command.

13. The computer system of claim 10, wherein the memory system is encoded with a prefetch optimizer process and wherein when the processor performs the prefetch optimizer process, the processor performs the step of:

periodically optimizing the prefetch criteria based on cache feedback from the storage system such that subsequent prefetch commands generated based on the prefetch criteria increase cache performance in the storage system.

14. The computer system of claim 10 wherein the prefetch criteria is further indicative of a range independent selection.

15. A computer system comprising:

a processor;

an interface coupled to a storage system;

a memory system encoded with a host prefetcher process and prefetch criteria;

an interconnection mechanism coupling the processor, the interface and the memory system;

wherein, when the processor performs the host prefetcher process, the processor causes the host computer system to cache data in the storage system by performing the steps of:

receiving a request to access data in the storage system;

generating a prefetch command for related data based on a comparison of the request against the prefetch criteria encoded in the memory system; and transmitting the prefetch command from the host computer system to the storage system via the interface to cause the storage system to cache at least a portion of the related data, and wherein:

the request to access data specifies a requestor requesting access to the data and specifies a data access technique for accessing the data and specifies data to which access is requested; and the prefetch criteria is maintained as entries in a prefetch database in the memory system, each entry including an encoding of at least one of:

i) requestor criteria indicating an identity of a requestor who may request access to the data;

ii) data access technique criteria indicating a type of access to the data to be made by a requestor matching the requestor criteria;

iii) data criteria indicating data to which access is requested according to the data access technique by a requestor matching the requestor criteria; and wherein each entry includes an encoding of corresponding prefetch information that includes caching instructions that apply to the related data that is related to the data specified in a request that matches prefetch criteria of that entry.

16. A computer system comprising:

a processor;

an interface coupled to a storage system;

a memory system encoded with a host prefetcher process and prefetch criteria;

an interconnection mechanism coupling the processor, the interface and the memory system;

wherein, when the processor performs the host prefetcher process, the processor causes the host computer system to cache data in the storage system by performing the steps of:

receiving a request to access data in the storage system;

generating a prefetch command for related data based on a comparison of the request against the prefetch criteria encoded in the memory system; and transmitting the prefetch command from the host computer system to the storage system via the interface to cause the storage system to cache at least a portion of the related data, and wherein the request to access data is a file system request received from an application encoded in the memory system and wherein the related data is a file stored within the storage system and wherein when the processor performs the step of generating, the processor further performs the steps of:

obtaining prefetch information indicating how related data from the file is to be cached in the storage system, the prefetch information obtained based on the comparison of the request against prefetch criteria contained in a prefetch database encoded in the memory system;

obtaining storage information including disk extent information indicating storage locations where the file is stored within the storage system; and generating the prefetch command based on the prefetch information and the storage information, the prefetch command containing instructions that instruct the storage system to obtain and cache portions of the related data from the file from the storage locations within the storage system indicated by the disk extent information.

17. The computer system of claim 16 wherein the prefetch command transmitted to the storage system from the host computer system indicates to the storage system to cache portions of the file located at the storage locations indicated by the disk extent information.

18. The computer system of claim 16 wherein the disk extent information indicates storage locations of the file that are fragmented across different storage locations within the storage system and wherein the prefetch command transmitted to the storage system from the host computer system indicates to the storage system to cache portions of the file located at the storage locations of the file that are fragmented across different storage locations within the storage system.

19. In a host computer system, a method for controlling data cached in a cache in a storage system, the method comprising the steps of:

receiving a request to access data from an application performing on the host computer system;

producing prefetch information containing caching instructions for related data that is related to the data specified in the request to access data by comparing the request to access data against prefetch criteria defined within a prefetch database in the host computer system;

obtaining storage information for the related data, the storage information indicating a layout of storage locations within the storage system that store the related data;

generating at least one prefetch command that instructs the storage system to cache the related data from storage locations indicated in the storage information and according to the caching instructions contained in the prefetch information; and transmitting the prefetch command to the storage system to cause the storage system to cache at least a portion of the related data.

20. A host computer system that can control data cached in a cache in a storage system, the host computer system comprising:

an interface to a storage system;

a processor;

a memory system;

an interconnection mechanism coupling the interface, the processor and the memory system; and a host prefetcher process encoded within the memory system, that when performed on the processor in the host computer system, causes the host computer system to:

receive a request to access data from an application that performs on the host computer system;

produce prefetch information containing caching instructions for related data related to data specified in the request to access data by comparing the request to access data against prefetch criteria defined within a prefetch database encoded within the memory system in the host computer system;

obtain storage information for the related data, the storage information indicating a layout of storage locations within the storage system that store the related data;

generate at least one prefetch command in the memory system that instructs the storage system to cache the related data from storage locations indicated in the storage information and according to the caching instructions contained in the prefetch information; and transmit the prefetch command from the memory system to the storage system via the interface to cause the storage system to cache at least a portion of the related data.

21. A computer program product having a computer-readable medium including computer program logic encoded thereon that when performed on a host computer system, causes the host computer system to control caching of data with a storage system, and wherein when the computer program logic is performed on a processor in the host computer system, the computer program logic causes the processor to perform the operations of:

receiving a request to access data, the request to access data specifying at least one of a requester requesting access to the data, and a data access technique for accessing the data, and data to which access is requested;

generating a prefetch command for related data based on a comparison of the request against prefetch criteria, the computer program logic that, when performed on the processor, causes the processor to perform the operation of generating a prefetch command, further includes instructions that, when performed on the processor, cause the processor to perform the operations of:

querying a prefetch database containing the prefetch criteria to obtain prefetch information based on the request using a prefetch query containing at least one of:

a) a characteristic of the data;

b) a characteristic of the request to access data; and formulating the prefetch command based on the prefetch information; and transmitting the prefetch command to the storage system to cause the storage system to cache at least a portion of the related data, and wherein:

the prefetch information includes caching instructions for the related data; and wherein the computer program logic that, when performed on the processor, causes the processor to perform the operation of formulating the prefetch command, further includes instructions that, when performed on the processor, cause the processor to perform the operations of:

obtaining storage information for the related data stored in the storage system; and applying the prefetch information including the caching instructions to the storage information for the related data to generate at least one prefetch command that specifies a portion of the data to cache in the storage system from a location in the storage system specified by the storage information, such that when the prefetch command is transmitted to the storage system via the step of transmitting, the prefetch command advises the storage system to:

i) obtain the portion of the related data from the location; and ii) cache the portion of related data.

22. A computer program product having a computer-readable medium including computer program logic encoded thereon that when performed on a host computer system, causes the host computer system to control data cached in a cache in a storage system, and wherein when the computer program logic is performed on a processor in the host computer system, the computer program logic causes the processor to perform the operations of:

receiving a request to access data from an application performing on the host computer system;

producing prefetch information containing caching instructions for related data related to the data specified in the request to access data by comparing the request to access data against prefetch criteria defined within a prefetch database in the host computer system;

obtaining storage information for the related data, the storage information indicating a layout of storage locations within the storage system that store the related data;

generating at least one prefetch instruction that instructs the storage system to cache the related data from storage locations indicated in the storage information and according to the caching instructions contained in the prefetch information; and transmitting the prefetch command to the storage system to cause the storage system to cache at least a portion of the related data.

* * * * *

UNITED STATES PATENT AND TRADEMARK OFFICE
CERTIFICATE OF CORRECTION

PATENT NO.  : 6,728,840 B1
DATED       : April 27, 2004
INVENTOR(S) : Shatil et al.

It is certified that error appears in the above-identified patent and that said Letters Patent is hereby corrected as shown below:

Column 25,
Line 22, "The computer system of claim 11" should read -- The computer system of claim 1 --.

Signed and Sealed this

Third Day of August, 2004

JON W. DUDAS
*Acting Director of the United States Patent and Trademark Office*